(12) United States Patent
Le Strat et al.

(10) Patent No.: US 9,970,298 B2
(45) Date of Patent: May 15, 2018

(54) BALANCING SCREW, DEVICE AND METHOD FOR A ROTATING PART OF A TURBINE ENGINE

(71) Applicant: SNECMA, Paris (FR)

(72) Inventors: Jean-Luc Le Strat, Saint Michel sur Orge (FR); Hervé Pohier, La Queue en Brie (FR); Romain Jean-Louis Robert Thory, Fontaine le Port (FR)

(73) Assignee: SNECMA, Paris (FR)

( * ) Notice: Subject to any disclaimer, the term of this patent is extended or adjusted under 35 U.S.C. 154(b) by 244 days.

(21) Appl. No.: 14/761,178

(22) PCT Filed: Jan. 6, 2014

(86) PCT No.: PCT/FR2014/050005
§ 371 (c)(1),
(2) Date: Jul. 15, 2015

(87) PCT Pub. No.: WO2014/111641
PCT Pub. Date: Jul. 24, 2014

(65) Prior Publication Data
US 2015/0354360 A1    Dec. 10, 2015

(30) Foreign Application Priority Data

Jan. 18, 2013    (FR) ..................... 13 50428

(51) Int. Cl.
*F01D 5/02*    (2006.01)
*F16F 15/32*    (2006.01)
(Continued)

(52) U.S. Cl.
CPC ............... *F01D 5/027* (2013.01); *F02C 7/04* (2013.01); *F16B 23/0038* (2013.01);
(Continued)

(58) Field of Classification Search
CPC ..... F01D 5/027; Y10T 29/49321; G01M 1/32
(Continued)

(56) References Cited

U.S. PATENT DOCUMENTS 1,172,406 A * 2/1916 Taylor ................... F16B 37/122
411/395
2,385,252 A * 9/1945 Bennett, Jr. ............. F16F 15/32
16/404
(Continued)

FOREIGN PATENT DOCUMENTS

DE           3532929 A1 * 3/1987 ............. F01D 5/025
DE      202 02 624 U1    5/2002
(Continued)

OTHER PUBLICATIONS

English translation of DE 3532929.*
(Continued)

*Primary Examiner* — Dwayne J White
*Assistant Examiner* — Topaz Elliott
(74) *Attorney, Agent, or Firm* — Pillsbury Winthrop Shaw Pittman LLP

(57) ABSTRACT

A balancing device for a rotating part of a turbomachine, includes a ferrule pierced with a plurality of ports, a balancing screw passing through each port, each balancing screw including a body and a head, the head of each balancing screw being pierced with a recess, the balancing screws being of at least one first type, the recess of the screws of the first type being formed by a driving recess from which an additional recess extends.

9 Claims, 4 Drawing Sheets

(51) Int. Cl.
*F02C 7/04* (2006.01)
*F16B 23/00* (2006.01)
*G01M 1/32* (2006.01)

(52) U.S. Cl.
CPC .......... *F16B 23/0053* (2013.01); *F16F 15/32* (2013.01); *G01M 1/32* (2013.01); *Y02T 50/671* (2013.01); *Y10T 29/49321* (2015.01)

(58) Field of Classification Search
USPC .................. 411/395, 481, 479; 74/572.4
See application file for complete search history.

(56) References Cited

U.S. PATENT DOCUMENTS

| | | | | |
|---|---|---|---|---|
| 3,556,533 | A * | 1/1971 | Hollis | A63B 53/04 411/900 |
| 5,285,700 | A * | 2/1994 | Lau | F16F 15/34 415/119 |
| 5,487,640 | A * | 1/1996 | Shaffer | F01D 5/027 29/447 |
| 7,303,377 | B2 * | 12/2007 | Rockarts | F01D 5/027 416/144 |
| 7,753,651 | B2 * | 7/2010 | Dezouche | F01D 5/027 416/145 |
| 9,279,338 | B2 * | 3/2016 | Quiroz-Hernandez | B64C 11/008 |
| 9,382,952 | B2 * | 7/2016 | Hauss | F16F 15/34 |
| 2012/0328439 | A1 * | 12/2012 | Quiroz-Hernandez | B64C 11/008 416/128 |

FOREIGN PATENT DOCUMENTS

| | | | |
|---|---|---|---|
| DE | 10333057 A1 * | 2/2005 | ............ F16F 15/322 |
| FR | 1 271 525 A | 9/1961 | |
| FR | 78 328 E | 7/1962 | |
| FR | 91 601 E | 7/1968 | |
| FR | 2 920 187 A1 | 2/2009 | |
| FR | 2 953 896 A1 | 6/2011 | |
| WO | WO 01/27479 A1 | 4/2001 | |
| WO | WO 01/49459 A1 | 7/2001 | |

OTHER PUBLICATIONS

English translation of DE 10333057.*
English translation of FR 2953896 (Foreign document listed on the IDS, only abstract provided).*
International Search Report as issued in International Patent Application No. PCT/FR2014/050005, dated Mar. 13, 2014.

* cited by examiner

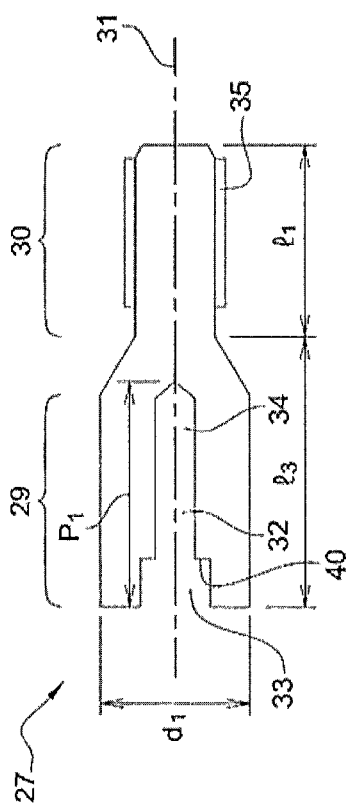
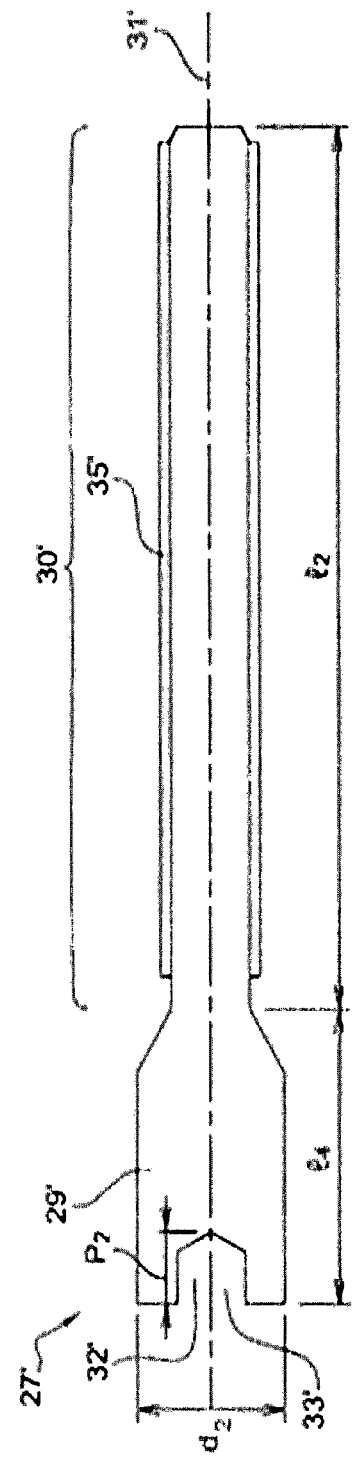

BALANCING SCREW, DEVICE AND METHOD FOR A ROTATING PART OF A TURBINE ENGINE

CROSS-REFERENCE TO RELATED APPLICATIONS

This is the U.S. National Stage of PCT/FR2014/050005, filed Jan. 6, 2014, which in turn claims priority to French Patent Application No. 1350428, filed Jan. 18, 2013, the entire contents of all applications are incorporated herein by reference in their entireties.

TECHNICAL FIELD

The present invention relates to a balancing screw for an engine balancing device for an inlet cowl of a turbomachine, as well as an engine balancing device for an inlet cowl of a turbomachine, as well as a turbomachine including such a balancing device. The present invention also relates to an inlet cowl including such a balancing device, as well as a balancing method using such a balancing device.

STATE OF PRIOR ART

A rotating inlet cowl 10 of an aircraft turbomachine generally includes two parts attached to each other, as represented in FIG. 1:
- a cone-shaped front part, referred to as a front cone 11. The front cone 11 has a cone tip-shaped front end 13 centred on an axis of rotation X of the inlet cowl 10, also corresponding to a longitudinal axis of the entire turbomachine. The front cone 11 also has a back end 14 radially extending with respect to the axis X in an annular shape.
- a back part, referred to as a back ferrule 12, extending along the longitudinal axis X of the turbomachine and extending from the front cone 11. The back ferrule 12 has a front end 15 radially extending with respect to the axis X in an annular shape. Conventionally, the front cone 11 and the back ferrule 12 are attached by bolts 16 passing from front to rear through the back end 14 of the front cone 11 and the front end 15 of the back ferrule 12.

It is noted that the terms "front" and "rear" are to be considered with respect to a general direction of fluid flow through the turbomachine, from front to rear as is schematically represented by an arrow 100.

In a known manner, the turbomachine includes so-called major modules, themselves including so-called minor modules. This module distribution allows an easy assembling system per sub-elements, but also a distribution of the unbalances by modular balancing. Indeed, each minor rotating module is dynamically balanced in order to reduce its unbalance and thus limit the impact on the engine once assembled. An unbalance is a parasitic mass causing an imbalance of a rotating part.

Then, once assembled, the turbomachine is itself balanced. Conventionally, the back ferrule 12 has thirty six holes 17 distributed on its periphery, wherein nuts 18 are crimped. The crimped nuts 18 are able to receive so-called balancing screws enabling the overall unbalance of the turbomachine to be restricted. Indeed, by judiciously choosing the weights of the balancing screws to be screwed in the nuts 18, the turbomachine is balanced.

However, in small engines, the engine balancing function by implanting balancing screws of different lengths and masses is difficult to make. Indeed, in small engines, the front cone has a small diameter such that the centre of gravity of the screws is consequently located very close to the engine axis which reduces their total balancing capability. Further, the diameter and the reduced overall space force to reduce the number of screws used and to take screws with a small threaded diameter, which leads to a decrease in the total mass of the screws, and thus of the total balancing capability. Further, in small engines, the balancing screws make the turbomachine heavier.

DISCLOSURE OF THE INVENTION

The invention aims at overcoming the drawbacks of the state of the art by providing a balancing screw for a balancing device which enables the balancing device to be used in small engines, which is optimized in terms of mass with respect to that of prior art.

To do so, it is provided according to a first aspect of the invention, a balancing screw for a balancing device of a turbomachine, the balancing screw including a body and a head, the head being pierced with a recess, the recess being formed by a driving recess and by an additional recess, the driving recess having a bottom, the bottom of the driving recess being pierced with the additional recess.

Having an additional recess which actually extends from the driving recess provides a lighter balancing screw. Indeed, the mass of the screws can thus be decreased without modifying their external dimensions, which is advantageous because all ports of the ferrule which are intended to receive screws must necessarily be obstructed by screws even if some of these screws are not useful for balancing, because these ports lead to the stream. Consequently, it is advantageous to have screws with a low mass for the turbomachine not to be too heavy. In this case, the screwing head is pierced with a recess formed by the driving recess and by an additional recess which extends from the driving recess. The additional recess preferably has a cylindrical shape so as to facilitate its manufacture. Further, the additional recess preferably has dimensions lower than those of the driving recess such that a spanning tool inserted in the driving recess can abut against the bottom of the driving recess, at the limit with the additional recess.

A second aspect of the invention relates to a balancing device for a rotating part of a turbomachine, including a ferrule pierced with a plurality of ports, a balancing screw according to the first aspect of the invention passing through each port.

The balancing device according to the invention can also include one or more of the characteristics hereinafter taken singly or according to any technically possible combinations.

Advantageously, the balancing screws are of at least a first and a second type, the recess of the screws of the first type having a depth p1, the balancing screws of the second type having a recess depth p2, p2 being strictly lower than p1, the balancing screws of the second type and of the first type being radially distributed about the ferrule so as to balance the rotating part.

Having a balancing device wherein the depth of the recess of the screw heads is varied so as to compensate for the unbalance provides more possibilities to balance the turbomachine, including when it has small dimensions. Indeed, varying the depth of the recess allows a greater variation in the mass and in the position of the centre of gravity of the balancing screws, which provides more possibilities to balance the engine, including when this engine has reduced dimensions. The mass of the balancing screws can thus be varied without varying their external dimensions.

Advantageously, the balancing screws of the first and the second types include a driving recess suitable for receiving a spanning tool.

The recess of the balancing screws of the second type preferably corresponds to the driving recess of the balancing screws of the second type. Thus, the balancing screws of the second type preferably have a minimum recess, which enables them to have a higher mass. In this case, the recess which corresponds to the driving recess preferably has a shape adapted to that of the spanning tool which is intended to be inserted in the driving recess.

According to one embodiment:
the balancing screws of the first type are made of a material having a first density m1,
the balancing screws of the second type are made of a material having a second density m2, m2 being strictly higher than m1.

Using different materials for the balancing screws provides more possibilities to balance the rotating part, which is advantageous in the case where the ferrule has small dimensions, and where the balancing possibilities by modifying the external dimensions of the balancing screws are restricted.

Advantageously, the balancing screws of the first type are made of titanium.

Advantageously, the balancing screws of the second type are made of steel.

According to one embodiment:
the screws of the first type have a length l1;
the screws of the second type have a length l2, l2>l1.

This enables the mass variation between the screws of the first type and the screws of the second type to be further increased.

The balancing screws preferably have cylindrical screw heads, which enables the manufacture of the balancing screws to be facilitated. Further, in the case of the balancing screws of the second type, this enables the mass of their head to be further increased. Increasing the mass of the screw heads of the second type enables their centre of gravity to be moved towards the head of said screws, and thus to be moved away from the engine axis, which enables the screw balancing capability to be increased.

According to different embodiments:
the head of each balancing screw of the first type has a mass at least equal to 60% of the total mass of said balancing screw; and/or
the head of each balancing screw of the second type has a mass at least equal to 40% of the total mass of said balancing screw.

Having a relatively heavy head with respect to the total weight of the screw enables the centre of gravity of the screws to be moved towards said head, which enables the screw balancing capability to be increased.

More generally, balancing screws with more or less large screw heads can be used to compensate for the length of the screw body. Thus, when the space is restricted in the ferrule and consequently, the size of the screw bodies is restricted, the size of the screw body can be compensated for by that of the screw heads.

It can be contemplated that all the balancing screws of the first type are identical to each other so as to simplify the manufacture of the balancing device.

For the same reasons, it can also be contemplated that all the balancing screws of the second type are identical to each other so as to simplify the manufacture of the device.

In this case, when the use of two groups of identical balancing screws inside each of said groups is not sufficient to compensate for the unbalance of the rotating machine, the balancing device can also include intermediate balancing screws, each intermediate screw having a mass between the mass of one of the screws of the first type and the mass of one of the screws of the second type. These intermediate balancing screws enable all the balancing criteria to be fulfilled and nuances in balancing to be made.

The intermediate balancing screws can for example be:
screws made of the same material and which have the same external dimensions as the balancing screws of the first type, but which do not include any additional recess beyond their driving recess;
screws which have dimensions equal to those of the screws of the first type but which are made of a material the density of which is higher than that of the material of the screws of the first type;
screws which are made of the same material as the screws of the first type but which have lower dimensions . . . .

The dimensions of the screw heads can in particular be varied so as to balance the rotating part.

A third aspect of the invention relates to an inlet cowl of a turbomachine including a balancing device according to the second aspect of the invention.

A fourth aspect of the invention relates to a turbomachine including a balancing device according to the second aspect of the invention.

A fifth aspect of the invention relates to a method for balancing a rotating part of a turbomachine provided with a balancing device according to the second aspect of the invention, the method including a step of adjusting the depth of the recess of the screw heads so as to balance the rotating part.

Advantageously, the balancing method further includes the step of adjusting one or more of the following parameters to balance the rotating part:
the external dimensions of each of the screw heads;
the shape of the screw heads;
the material of the balancing screws.

The method can also include the following steps:
a step of inserting the balancing screws of the first type in each port of the ferrule;
a step of rotating the rotating part so as to detect the presence of an unbalance;
in case of the detection of an unbalance, a step of replacing some of the balancing screws of the first type with balancing screws of the second type and/or intermediate balancing screws so as to compensate for the unbalance.

For this, the method can include a step of adjusting the mass of the screw heads of the second type and/or intermediate balancing screws in order to compensate for the unbalance of the rotating part.

The mass of a screw head can be adjusted in particular:
by making a more or less deep recess in said head;
by increasing the external dimensions of said head, and in particular its height;
by modifying the shape of said head. Thus, with an equivalent overall space, a cylindrical screw head will have a higher mass than a hexagonal screw head;
by modifying the material of said head.

The variation in the mass of each head can thus be used to compensate for variations in the mass of the screw body. Indeed, the mass of the screw body is restricted by the available space inside the ferrule. The screw heads can thus be used to have more possibilities to balance the rotating machine.

BRIEF DESCRIPTION OF THE FIGURES

Further characteristics and advantages of the invention will appear upon reading the detailed description that follows, in reference to the appended figures, which illustrate:

FIG. 7, a cross-section view of one of the screws of the inlet cowl of FIG. 2;

FIG. 8, a cross-section view of another screw of the inlet cowl of FIG. 2.

For more clarity, identical or similar elements are marked with identical reference signs throughout the figures.

DETAILED DESCRIPTION OF AT LEAST ONE EMBODIMENT

FIGS. 2 and 4 to 6 represent an inlet cowl 20 of a turbomachine including a balancing device according to one embodiment of the invention.

Figure 1:
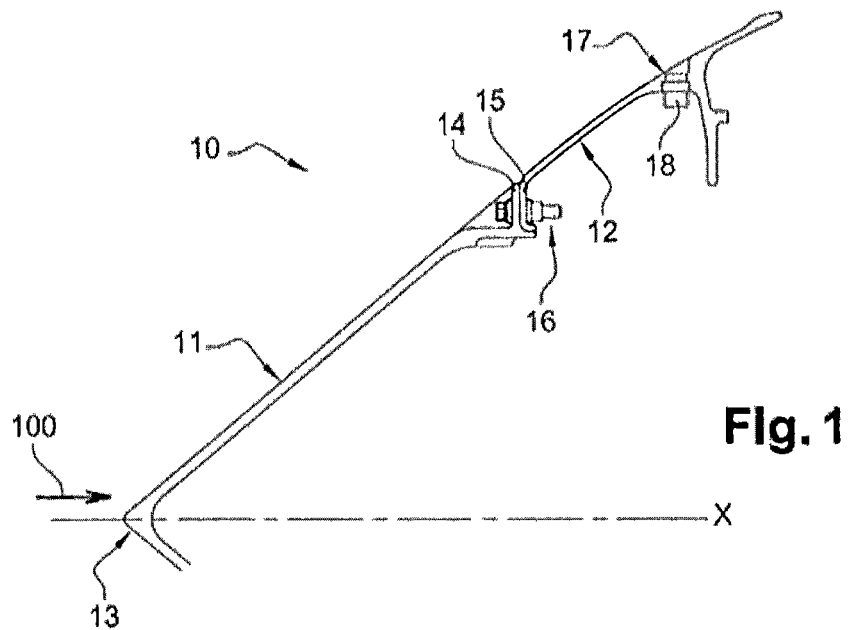
FIG. 1, a cross-section view of an inlet cowl of a turbomachine of prior art.
Figure 2:
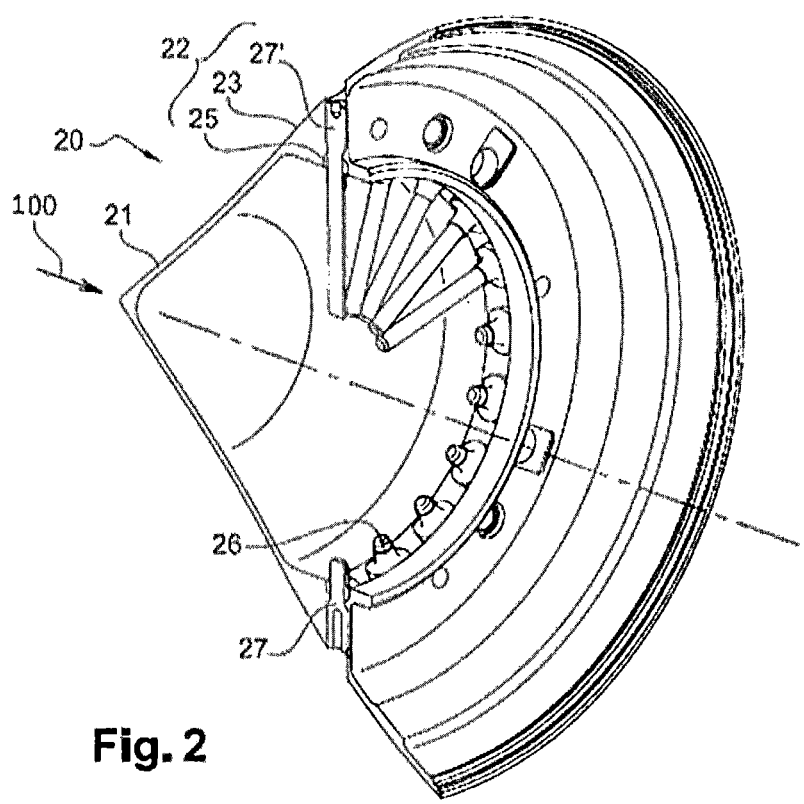
FIG. 2, a perspective view of an inlet cowl of a turbomachine according to one embodiment of the invention.
Figure 3:
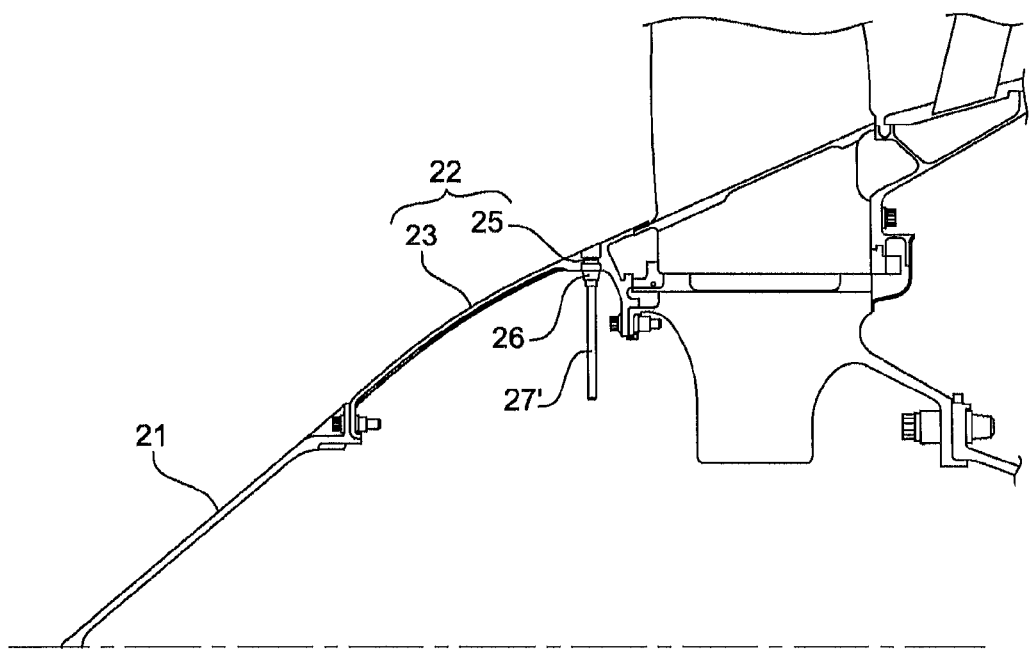
FIG. 3, a cross-section view of the inlet cowl of FIG. 2.
Figure 4:
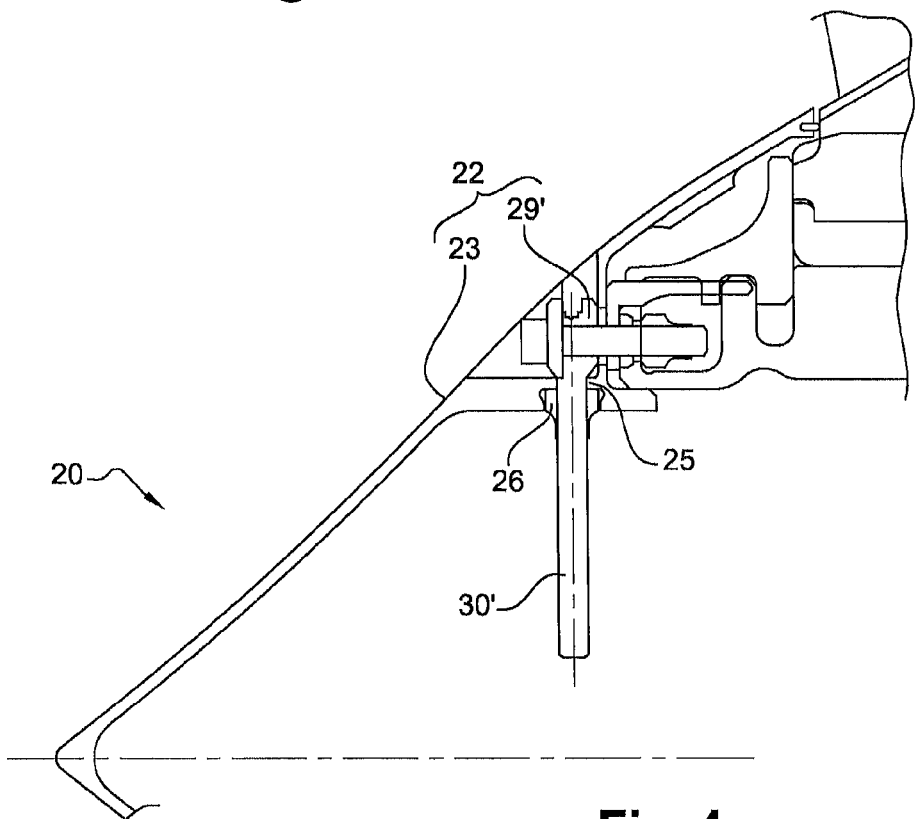
FIG. 4, an enlarged cross-section view of a part of the inlet cowl of FIG. 2.
Figure 5:
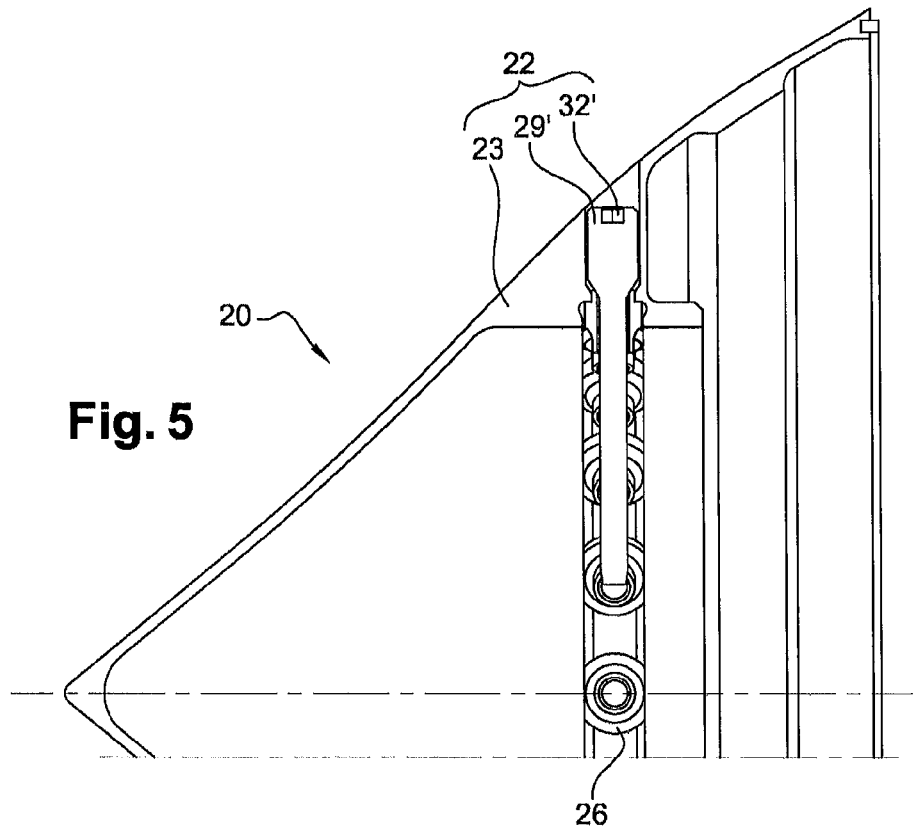
FIG. 5, another cross-section view of a part of the inlet cowl of FIG. 2.
Figure 6:
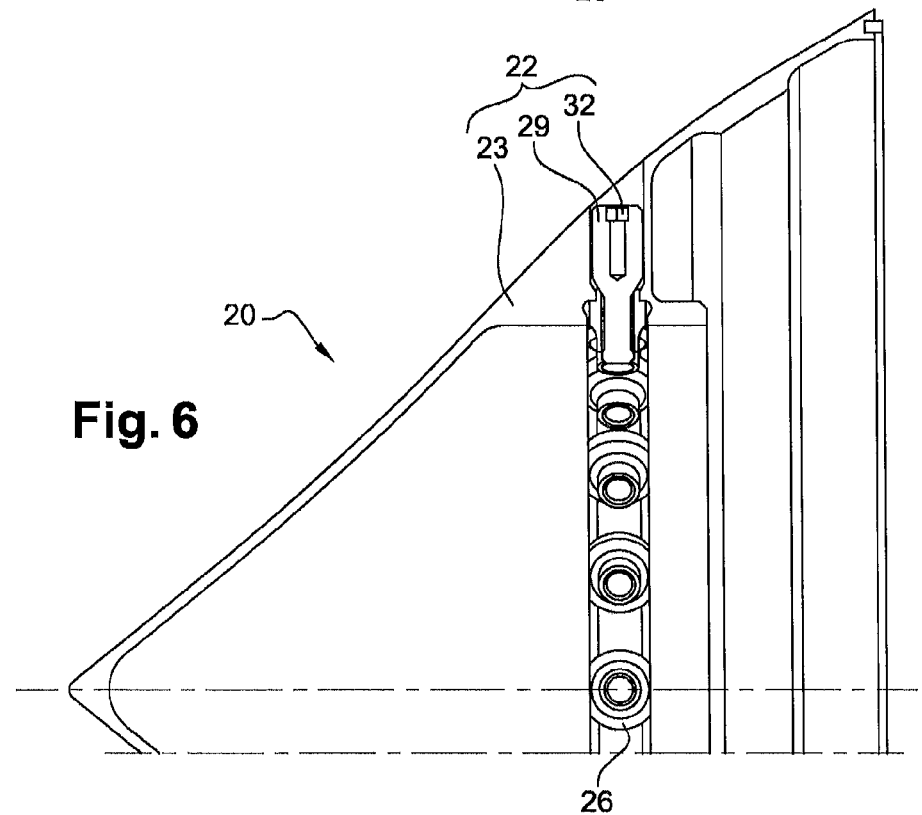
FIG. 6, another cross-section view of another part of the inlet cowl of FIG. 2.

This inlet cowl 20 includes a cone 21 provided with a balancing device 22. The balancing device 22 includes a ferrule 23. The ferrule 23 has in this case a conical shape. In this embodiment, the ferrule 23 is formed by a back part of the cone 21. However, in the embodiment of FIG. 3, the ferrule 23 is formed by an additional part 24 which has a rotational symmetry and which is connected to the cone 21.

The ferrule 23 is pierced with ports 25 which are radially distributed throughout the perimeter of the ferrule 23. In this embodiment, the ferrule 23 is pierced with twenty ports 25. However, the number of ports depends in particular on the diameter of the ferrule 23 and the desired balancing accuracy.

The balancing device also includes nuts 26, each nut 26 being crimped in one of the ports 25. The crimped nuts 26 are able to receive so-called balancing screws 27, 27' so as to decrease or even remove the unbalance of the turbomachine.

For this, balancing screws 27 of a first type are first inserted in each of the ports 25 and screwed in each of the nuts.

The turbomachine is then rotated so as to detect the presence of a possible unbalance.

If an unbalance is detected, some screws of the first type 27 are then replaced with balancing screws of a second type 27' so as to decrease the unbalance. The balancing screws of the first type 27 and of the second type 27' are radially distributed about the ferrule so as to decrease the unbalance of the turbomachine. In this exemplary embodiment, five screws of the first type 27 have been replaced with five screws of the second type 27', however, the radial distribution and the respective number of the screws of the first type and of the second type depend on the unbalance.

The balancing screws of the second type 27' have a mass higher than that of the screws of the first type 27.

A screw of the first type 27 is more precisely represented in FIG. 7.

The balancing screw of the first type 27 extends along a reference axis 31. The balancing screw of the first type 27 is preferably made of titanium. The balancing screw of the first type 27 includes a head 29 and a body 30. The body 30 of the balancing screw of the first type 27 includes on its external surface a thread 35 enabling the balancing screw of the first type 27 to be screwed in the nut 26. The body 30 of the screw of the first type 27 has a length l1 sufficient to be able to be wholly screwed in the nut 26. However, the length l1 is preferably chosen such that the body 30 does not project too much from the nut 26 such that the turbomachine is not made too heavy. The head 29 of the screw of the first type is pierced with a recess 32. The recess 32 is formed by a driving recess 33 and by an additional recess 34 located in the axial extension of the driving recess 33. The driving recess 33 has a bottom 40 which is pierced with the additional recess 34. The driving recess 33 is able to receive a spanning tool enabling the screw to be screwed in the corresponding nut 26. For this, the driving recess 33 preferably has a hexagonal cross-section. The additional recess 34 has preferably a cylindrical shape so as to facilitate its machining. Besides, it preferably has transverse dimensions with respect to the reference axis 31 which are lower than those of the driving recess 33 such that a spanning tool inserted in the driving recess 33 abuts against the bottom 40, at the limit between the driving recess 33 and the additional recess 34. The depth p1 of the recess 32 is adjusted as a function of the desired mass for the screw and more precisely for the head of this screw. In the same way, the transverse dimensions of the additional recess can be adjusted as a function of the desired mass for the screw and more precisely for the head of the screw. The head 29 is preferably cylindrical to facilitate its manufacture.

The dimensions of the screws of the first type 27 can be modified as a function of the mass they must have to balance the turbomachine. Thus, the length l1 of the body 30 of the screws of the first type 27 can first be modified. The mass of the head 29 can also be modified to achieve the desired balancing. For this, the dimensions of the head 29, and in particular its height l3 can in particular be modified. The depth p1 of the recess 32, as well as its shape can also be modified. It can also be contemplated to modify the shape of the head 29. The head 29 has a diameter d1.

A screw of the second type 27' is more precisely represented in FIG. 8.

The balancing screws of the second type 27' are substituted for some of the balancing screws of the first type 27 so as to decrease the unbalance of the turbomachine.

The balancing screw of the second type 27' is preferably made of steel. The balancing screw of the second type 27' also extends along a reference axis 31' and it also has a head 29' and a body 30'. The body 30' of the balancing screw of the second type 27' also includes on its external surface a thread 35' enabling the balancing screw of the second type 27' to be screwed in the nut 26. The body 30' preferably has a length l2 higher than the length l1 of the body 30 of the balancing screw of the first type 27. The head 29' is pierced with a recess 32'. The recess 32' is formed in this exemplary embodiment by a spanning tool. In this embodiment, the recess 32' does not extend beyond the driving recess 33'. Consequently, in this example, the depth p2 of the recess 32' corresponds to the depth of the driving recess 33'. The depth p2 is thus lower than the depth p1. The recess 32' of the balancing screw of the second type 27' is thus minimum in this embodiment so as to maximize the mass of the heads and thus the screw balancing capability. Likewise, the head is preferably cylindrical so as to maximize its mass. The head 29' has a diameter d2.

The dimensions of the screws of the second type 27' can be modified as a function of the mass they must have to balance the turbomachine. Thus, the length l2 of the body 30' of the screws of the second type 27' can be first modified. However, this length l2 is restricted by the space inside the ferrule. Consequently, it is advantageous to modify the mass of the head 29' to obtain the desired balancing. For this, the dimensions of the head 29', and in particular its height l4 can in particular be modified. The depth p2 of the recess, as well as its shape can also be modified. It can also be contemplated to modify the shape of the head 29'.

Besides, in this exemplary embodiment, all the balancing screws of the first type 27 were identical to each other, as well as all the balancing screws of the second type 27' were identical to each other. However, it could also be contemplated to use balancing screws of the first type 27 being different from each other and/or balancing screws of the second type 27' being different from each other.

Besides, if the use of two types of screw is not sufficient to balance the unbalance of the turbomachine, and as a function of the desired balancing accuracy, intermediate screws, having a mass between the screws of the first type 27 and the screws of the second type 27' can be used.

Naturally, the invention is not restricted to the embodiments described with reference to the figures and alternatives can be contemplated without departing from the scope of the invention. The radial distribution of the screws can thus be modified as a function of the unbalance to be balanced. Other materials can also be used to make the balancing screws.

The invention claimed is:

1. A balancing device for a rotating part of a turbomachine, comprising a ferrule pierced with a plurality of ports, and a balancing screw passing through each port of the plurality of ports, each balancing screw including a body and a head, the head being pierced with a recess, wherein the balancing screws are of a first type and a second type, wherein the recess of the balancing screw of the first type is formed by a driving recess and by an additional recess, the driving recess having a bottom, the bottom of the driving recess being pierced with the additional recess, and wherein the recess of the balancing screw of the second type is formed only by a second driving recess.

2. The balancing device according to claim 1, wherein:
   the balancing screws of the first type are made of a material having a first density m1,
   the balancing screws of the second type are made of a material having a second density m2, m2 being strictly higher than m1.

3. The balancing device according to claim 2, wherein:
   the balancing screws of the first type are made of titanium;
   the balancing screws of the second type are made of steel.

4. The balancing device according to claim 1, wherein:
   the screws of the first type have a length l1;
   the screws of the second type have a length l2, l2>l1.

5. The balancing device according to claim 1, wherein the balancing screw heads are cylindrical.

6. The balancing device according to claim 1, wherein:
   the head of each balancing screw of the first type has a mass at least equal to 60% of a total mass of said balancing screw; and/or
   the head of each balancing screw of the second type has a mass at least equal to 40% of a total mass of said balancing screw.

7. The balancing device according to claim 1, further comprising additional balancing screws, each additional balancing screw having a mass between the mass of one of the screws of the first type and the mass of one of the screws of the second type.

8. A method for balancing a rotating part of a turbomachine provided with the balancing device according to claim 1, the method comprising adjusting a depth of the recess of the balancing screw of the first type and/or the recess of the balancing screw of the second type so as to balance the rotating part.

9. The balancing method according to claim 8, further comprising adjusting one or more of the following parameters to balance the rotating part:
   external dimensions of each of the heads;
   a shape of the screw heads;
   a material of the balancing screws.

* * * * *